Jan. 7, 1958  R. DEIBEL  2,818,702

SUCTION POWER BRAKE

Filed Feb. 12, 1954

INVENTOR.
Raymond Deibel
BY
Beau, Brooks, Buckley & Beau,
ATTORNEYS.

United States Patent Office 2,818,702
Patented Jan. 7, 1958

2,818,702

SUCTION POWER BRAKE

Raymond Deibel, Cheektowaga, N. Y., assignor to Trico Products Corporation, Buffalo, N. Y.

Application February 12, 1954, Serial No. 409,846

6 Claims. (Cl. 60—14)

This invention relates to an accessory system for automotive vehicles, and more particularly to the braking system therefor.

In recent years there has been a pronounced tendency toward the utilization of power operated brakes in automotive vehicles. One of the systems in common use employs a vacuum booster to activate the brake, the source of vacuum being the intake manifold of the vehicle's engine. However, the intake manifold can provide such vacuum only when the engine is turning over. In most modern vehicles equipped with automatic transmissions, the engine tends to cut out at between 8 to 30 M. P. H. depending upon the type of transmission employed. As a result, no vacuum is available for brake operation, and as a pressure of from 75 to 80 pounds per square inch is necessary to operate brakes of the vacuum booster type, the operator of the vehicle cannot effectively apply the brake by mere foot power. As instant and effective brake operation is vital to the safety of vehicular travel, there is therefore a pronounced need for an auxiliary control arranged to function automatically and preferably before the intake manifold source of suction is completely lost.

The present invention contemplates the use of an electrically driven auxiliary pump having a pressure responsive switch in series therewith. The pressure responsive element of the switch is placed in communication with the oil pump of the vehicle's lubricating system, and is adjusted so as to close the switch when the oil pressure drops below a predetermined magnitude. As the engine comes to a stall, oil pressure is lost prior to the complete dissipation of the manifold vacuum. As a consequence, the pressure responsive switch will close, completing the circuit to the electric motor a split second before the manifold vacuum disappears. Therefore, during the time necessary for the operator to move his foot from the accelerator to the brake pedal, the electrically driven pump will automatically commence operation, making an auxiliary vacuum available for instant brake operation.

Accordingly, it is the primary object of the present invention to provide a fluid pressure braking system wherein a vacuum of sufficient magnitude for brake activation is available at all times.

It is a further object of the invention to provide a system wherein an auxiliary vacuum is automatically made available for brake operation just prior to the complete dissipation of the manifold vacuum.

For a better understanding of these and other objects of the invention reference is made to the following specifications and accompanying drawings wherein.

Figure 1:
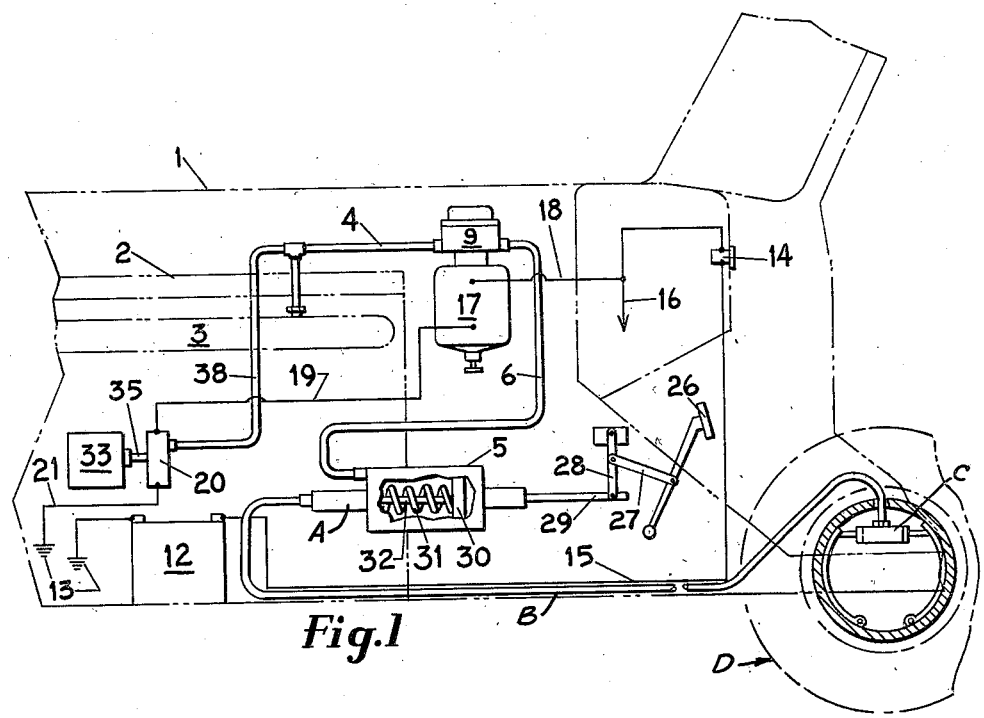
Fig. 1 is a diagrammatic view, partly broken away, portraying an automotive vehicle equipped with a braking system constructed in accordance with the instant invention.

Referring now more particularly to the drawings, the numeral 1 designates an automotive vehicle and 2 the engine with 3 being the intake manifold thereof. Conduit 4 leads from the manifold to the exhaust side of pump 9, while conduit 6 interconnects pneumatic cylinder 5 of the power brake and the intake side of the pump.

One terminal of battery 12 is grounded at 13 while the other terminal is connected to ignition switch 14 by lead 15. The opposite side of the switch is connected to the conventional ignition circuit of the vehicle, not shown, by lead 16. Electric motor 17 is placed in parallel with the aforementioned ignition circuit by lead 18 while lead 19 is utilized to place the motor and pressure responsive switch 20 in series with one another. The opposite side of the switch is grounded at 13 via lead 21.

If the vehicle's engine is in operation, a vacuum will be existent in manifold 3. As a result of such vacuum, air will be evacuated from conduit 6 via passageways 22 and 23 of pump 9, with valves 24 and 25 opening against the resistance of their respective springs due to the pressure differentials across said valves. Upon passing valve 25, the air is drawn into conduit 4 from whence it enters the manifold. Concurrently, pump 33 drives oil under pressure into the lubricating system of the vehicle and into pressure chamber 34 of pressure responsive switch 20 via coupling 35. Simultaneously, in the preferred embodiment of the invention illustrated in Figs. 1 and 2, air is withdrawn from vacuum chamber 36 by the manifold via passageway 37 and conduit 38 attached to nipple 39 to supplement the above oil pressure. A pressure differential is therefore created across pressure responsive diaphragm 40 forcing it and plunger 41 downward against the resistance of spring 42. As the plunger moves downward, spring fingers 21' and 19' which are connected to leads 21 and 19 in a conventional manner, are placed in contact with member 43 which may be rubber, ceramic or any other material having good electrical insulating properties. This results in an open circuit to motor 17, and the latter remains inactive.

Figure 2:
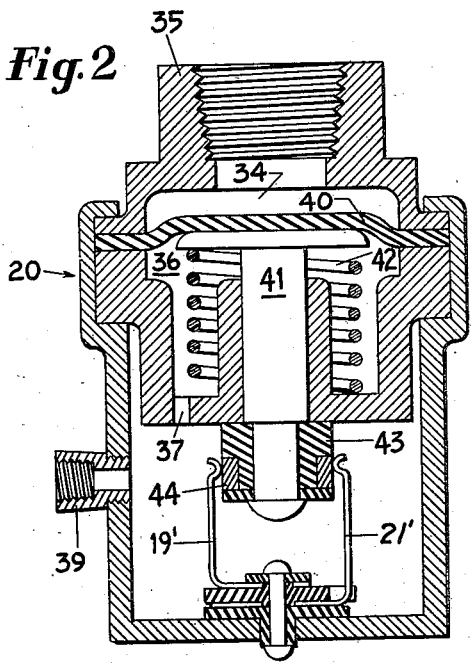
Fig. 2 is a sectional view of the pressure responsive switch.
Figure 3:
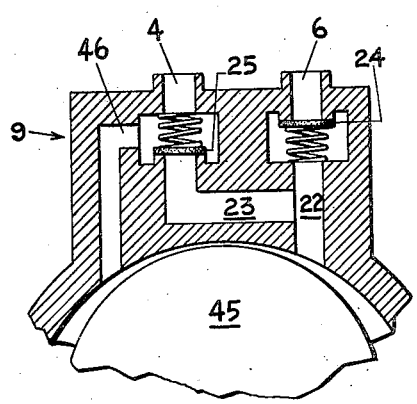
Fig. 3 is a fragmentary sectional view of the auxiliary pump illustrating the valving system therein.

If the operator of the vehicle desires to utilize the brake, he depresses pedal 26 resulting in the opening of a valve, not shown, via links 27, 28 and 29. With the valve open, conduit 6 is placed in communication with the interior of cylinder 5, resulting in the evacuation of the latter. A pressure differential is thus created across piston 30 causing it to move to the left against the resistance of spring 31. Such motion is transmitted to the master brake cylinder A by rod 32. The brake fluid contained within the master cylinder A then transmits the brake pressure through hydraulic lines B to hydraulic servo mechanisms C arranged to actuate the brakes in vehicle wheels D in a manner well known by those in the art (Fig. 1). When the pedal is released, the piston 30 returns to the position illustrated under the urging of the spring 31 thereby permitting release of the wheel brakes in the ordinary manner.

In the event that the engine drops below normal idling speed, the oil pressure and manifold vacuum drop rapidly. This results in a rapid destruction of the oil and manifold vacuum pressure acting upon diaphragm 40 and the latter with plunger 41 is urged upward by the spring, moving slip ring 44 into contact with the spring fingers. The circuit to motor 17 is therefore completed, setting it and pump 9 with which it is mechanically connected in operation. As no vacuum is existent in the manifold under these circumstances, valve 25 will remain closed. Air will be drawn from conduit 6, past valve 24 by rotor 45 of the pump, and exhausted into the manifold via passageway 46 and conduit 4. Conduit 6 will therefore remain evacuated and a vacuum will be available for brake operation in spite of the dissipation of the manifold suction. When the engine returns to operating speed, the manifold vacuum will reappear and again be available for brake operation concurrently with an increase in the oil pressure. Simultaneously with the resurgence of the manifold vacuum, plunger 41 moves downward as a result of the recreation of the pressure differential across diaphragm 40, opening the circuit to motor 17, causing it and pump 9 to cease operation.

It may therefore be seen that regardless of the operating condition of the vehicle's engine, a vacuum of sufficient magnitude for brake operation is constantly available. Further, since the oil pressure drops more rapidly than the manifold vacuum as the engine commences to die, the pressure responsive switch may be so adjusted that it closes and thus causes the pump to commence operation prior to the complete destruction of the vacuum. As a result, the period during which the auxiliary vacuum created by the pump is building up overlaps the time during which the manifold vacuum is being dissipated. Since the two vacuums reinforce one another during this transient period there is even then sufficient suction available to operate the brake.

Having thus disclosed an exemplary embodiment thereof, what I claim as my invention is:

1. In an automotive vehicle having an engine with a primary source of suction, an engine driven oil pump and a brake, an accessory system comprising, a pneumatic cylinder connected to the primary source of suction, an auxiliary source of suction interposed between the cylinder and the primary source, a piston enclosed within the cylinder and connected to the brake, said piston moving so as to activate the brake when air is withdrawn from the cylinder by either the primary or auxiliary sources of suction, and pressure responsive means coupled to the oil pump and operatively connected to the auxiliary source so as to activate said auxiliary source when the oil pressure generated by said pump drops below a predetermined magnitude.

2. In an automotive vehicle having an engine with a primary source of suction, an engine driven oil pump and a brake, an accessory system comprising, a pneumatic cylinder connected to the primary source of suction, an auxiliary source of suction interposed between the cylinder and the primary source, means enclosed within the cylinder and operatively connected to the brake so as to activate said brake when air is withdrawn from the cylinder, an electric motor for driving the auxiliary source of suction, and a pressure responsive switch in series with said motor and operatively connected to said oil pump and to said primary source, said switch having means holding the same inoperative by the joint pressures from the oil pump and the primary source and movable to close said switch and set said motor in operation when the oil pressure generated by said pump drops below a predetermined magnitude.

3. In an automotive vehicle having an engine with a primary source of suction, an engine driven oil pump and a brake, an accessory system comprising a switch having a vacuum chamber and a pressure chamber, means connecting said vacuum chamber and primary source of suction so that the vacuous condition existent in said vacuum chamber will be substantially similar to that in said primary source, additional means connecting said pressure chamber and oil pump so that the pressure existent in said pressure chamber will be substantially identical to that in said pump, a pressure responsive element in said switch interposed between said chambers so that one side of said element is exposed to the vacuous condition in said vacuum chamber while the opposite side of said element is exposed to the pressure existent in said pressure chamber, a pneumatic cylinder connected to the primary source of suction, an auxiliary source of suction interposed between said primary source and cylinder, a piston enclosed within said cylinder and connected to the brake, said piston moving so as to activate the brake when air is withdrawn from the cylinder by either the primary or auxiliary sources of suction, and means operatively connecting the auxiliary source and switch so as to activate said auxiliary source when the vector sum of the pressures to which the pressure responsive element is subjected drops below a predetermined magnitude.

4. In an automotive vehicle having an engine with a primary source of suction, an engine driven oil pump and a brake, an accessory system comprising a vacuum chamber, means connecting said chamber and primary source of suction so that the vacuous condition existent in said vacuum chamber will be substantially similar to that in said primary source, a pressure chamber, means connecting said pressure chamber and pump so that the pressure existent in said chamber will be substantially identical to that in said pump, a pressure responsive element interposed between said chambers so that one side of said element is exposed to the vacuous condition in said vacuum chamber while the opposite side of said element is exposed to the pressure existent in said pressure chamber, a pneumatic cylinder connected to the primary source of suction, an auxiliary source of suction interposed between the cylinder and the primary source, means enclosed within the cylinder and operatively connected to the brake so as to activate said brake when air is withdrawn from the cylinder, an electric motor for driving the auxiliary source of suction, a switch in series with said motor and operatively connected to said oil pump so as to close and set said motor in operation when the vector sum of the pressures to which the pressure responsive element is subjected drops below a predetermined magnitude.

5. In an automotive vehicle having an engine with a primary source of suction, an engine driven oil pump and a brake, an accessory system comprising a pneumatic cylinder connected to the primary source of suction, an auxiliary source of suction interposed between the cylinder and the primary source, means enclosed within the cylinder and operatively connected to the brake so as to activate said brake when air is withdrawn from the cylinder, an electric motor for driving the auxiliary source of suction, a pressure responsive switch in series with said motor, a spring urging said switch to closed position, and means operatively connecting said switch to said oil pump, said means opening said switch against the resistance of the spring when the oil pressure rises above a predetermined magnitude.

6. In an automotive vehicle having an engine with a primary source of suction, an engine driven oil pump and a brake, an accessory system comprising a vacuum chamber, means connecting said chamber and primary source of suction so that the vacuous condition existent in said vacuum chamber will be substantially similar to that in said primary source, a pressure chamber, means connecting said pressure chamber and pump so that the pressure existent in said pressure chamber will be substantially identical to that in said pump, a pressure responsive element interposed between said chambers so that one side of said element is exposed to the vacuous condition in said vacuum chamber while the opposite side of said element is exposed to the pressure existent in said pressure chamber, a pneumatic cylinder connected to the primary source of suction, an auxiliary source of suction interposed between the cylinder and the primary source, means enclosed within the cylinder and operatively connected to the brake so as to activate said brake when air is withdrawn from the cylinder, an electric motor for driving the auxiliary source of suction, a switch in series with said motor, a spring urging said switch to closed position, and means operatively connecting said switch to said pressure responsive element, said means opening said switch against the resistance of said spring when the vector sum of the pressures to which the pressure responsive element is subjected rises above a predetermined magnitude.

No references cited.